US011073094B1

(12) United States Patent
Dudar

(10) Patent No.: US 11,073,094 B1
(45) Date of Patent: Jul. 27, 2021

(54) FUEL VAPOR SYSTEM VALVE MONITORING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/850,565

(22) Filed: Apr. 16, 2020

(51) Int. Cl.
*F02D 41/00* (2006.01)
*F02M 25/08* (2006.01)

(52) U.S. Cl.
CPC ....... *F02D 41/004* (2013.01); *F02D 41/0045* (2013.01); *F02M 25/0809* (2013.01); *F02D 2200/0602* (2013.01); *F02M 25/0836* (2013.01)

(58) Field of Classification Search
CPC .... F02D 41/00; F02D 41/004; F02D 41/0045; F02D 2200/0602; F02M 25/0809; F02M 25/0836
See application file for complete search history.

(56) References Cited

U.S. PATENT DOCUMENTS 9,243,592 B2   1/2016  Dudar et al.
9,828,951 B2 * 11/2017 Dudar ............... F02M 25/0809

OTHER PUBLICATIONS

Bomey, N., "Ford recalls 1.5 million Ford Focus cars that could stall with fuel tank problem," USA Today, Available Online at https://www.usatoday.com/story/money/cars/2018/10/25/ford-focus-recall-1-5-m-cars-fixed-avoid-potential-stalling/1759870002/, Oct. 25, 2018, 1 page.

* cited by examiner

*Primary Examiner* — Hieu T Vo
(74) *Attorney, Agent, or Firm* — Geoffrey Brumbaugh; McCoy Russell LLP

(57) ABSTRACT

Methods and systems are provided for monitoring corking of a valve in a fuel vapor line during diagnostics of the fuel vapor system. In one example, a method may include, upon sealing the fuel vapor system during a diagnostic routine, estimating a threshold pressure of the fuel vapor system based on a fuel level in the fuel tank, and in response to an estimated pressure of the fuel system decreasing to the threshold pressure, opening a canister vent valve coupled to a vent line of the fuel vapor system.

20 Claims, 6 Drawing Sheets

FUEL VAPOR SYSTEM VALVE MONITORING

FIELD

The present description relates generally to methods and systems for monitoring corking of a valve in a fuel vapor system during diagnostics of the fuel vapor system.

BACKGROUND/SUMMARY

Vehicles may be fitted with evaporative emission control (EVAP) systems to reduce the release of fuel vapors to the atmosphere. For example, vaporized hydrocarbons (HCs) from a fuel tank may be stored in a fuel vapor canister packed with an adsorbent which adsorbs and stores the fuel vapors. At a later time, when the engine is in operation, the evaporative emission control system allows the fuel vapors to be purged into the engine intake manifold from the fuel vapor canister. The fuel vapors are then consumed during combustion. During certain conditions, the EVAP system may be monitored to identify breaches that can result in unwanted fuel vapor leaks. One example approach for verifying EVAP system integrity includes, during engine operation, sealing the EVAP system and monitoring transfer of vacuum from engine manifold to the EVAP system. During EVAP system diagnostics, in order to seal the EVAP system a canister purge valve (CPV) coupling the EVAP system to the engine manifold and a canister vent solenoid (CVS) coupled to a vent line of the EVAP system may be commanded closed. Over the course of vehicle operation, the CPV may entrap contaminants or other debris originating from components of the fuel system. These contaminants may inhibit the canister purge valve from closing completely.

An example approach for adjusting one or more valves coupled to the EVAP system in response to detection of degradation of the CPV is shown by Dudar in U.S. Pat. No. 9,243,592. In response to a CPV being stuck in an at least partially open position, the CVS may be pulsed open and closed while maintaining the CPV open at 100% duty cycle. By pulsing the CVS open while maintaining the CPV open, pressure pulsations are generated in the EVAP lines which may cause contaminants in the CPV and elsewhere in the EVAP system to be dislodged, thereby freeing the CPV.

However, the inventors herein have recognized potential issues with such systems. As one example, in presence of an undetected degradation of the CPV, during EVAP system diagnostics, if the CVS is in a closed position, vacuum from the engine manifold may build up expeditiously in the EVAP system. This vacuum build up may cause the CVS to be corked closed (such as vacuum sealed). The fuel system pressure as estimated via a fuel tank pressure transducer (FTPT) housed in a fuel line coupling the fuel tank and the fuel vapor canister may not be representative of pressure at the CVS valve. If the CVS is corked closed, an excessive level of vacuum may be applied to fuel system components such as the fuel tank which may cause deformation of the fuel tank. Further, if the CVS is corked close, it may not be possible to effectively purge the fuel vapors into the engine intake manifold from the fuel vapor canister. Also, a vacuum sealed CVS may not be pulsed open and closed to dislodge contaminants from a stuck open CPV. As such, this may result in earlier than expected warranty issues for the EVAP system. In addition, the vehicle may be emissions non-compliant.

In one example, the issues described above may be addressed by a method for an engine, comprising: during closure of a canister vent solenoid (CVS) coupled to a vent line of a fuel vapor system, estimating a threshold pressure of the fuel vapor system based on a fuel level in a fuel tank, and opening the CVS responsive to a pressure of the fuel vapor system decreasing to the threshold pressure. In this way, a CVS may be commanded open prior to it being vacuum sealed due to a higher than threshold level of vacuum build up in the EVAP system.

As one example, during engine operation at an idling speed, upon conditions being met, an EVAP system diagnostic routine may be carried out. In order to detect degradation of the EVAP system such as the CPV being stuck in an open position, the CPV valve and the CVS valve may be commanded to their respective closed positions while a fuel tank isolation valve (FTIV) positioned between the fuel tank and the fuel vapor canister may be commanded to an open position, thereby isolating the EVAP system from the engine manifold and the atmosphere. If the CPV is stuck in an at least partially open position, vacuum from the engine intake manifold may be transmitted to the EVAP system. A change in EVAP system pressure (vacuum build up) may be monitored for a pre-determined duration. A vapor space (vapor volume) of the fuel tank may be estimated based on one or more of fuel level in the fuel tank, a capacity of the fuel tank, and a volume of the fuel vapor canister. A derived transfer function may be used to estimate a threshold fuel system pressure with the vapor space as an input and a threshold fuel system pressure as the output. During the diagnostic routine, if an estimated fuel system pressure, as estimated via the FTPT, reaches the threshold fuel system pressure, the CVS may be commanded open regardless of the degree of completion of the diagnostic routine. Upon the fuel system pressure reaching the threshold pressure, the CPV may be indicated as degraded and engine operation may be suitably adjusted. A degradation of the CPV may be indicated in response to the vacuum in the fuel system reaching a vacuum threshold within the pre-determined duration of the routine.

In this way, by preemptively opening the CVS prior to the valve being stuck closed due to a lower than threshold fuel system pressure, hardware degradation may be averted. The preemptive opening of the CVS may be carried out even during conditions when a degradation (such as leak) in the CPV is not yet being detected. The technical effect of estimating a threshold fuel system pressure output based on a vapor space of the tank via a derived transfer function is a difference in the FTPT output and an actual vacuum experienced at the CVS may be accounted for. By accurately estimating the threshold fuel system pressure FTPT output, the CVS may be opened in time. By maintaining the functionality of the CVS, system integrity can be ensured and emissions compliance may be improved. In addition, early warranty issues for the EVAP system may be avoided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
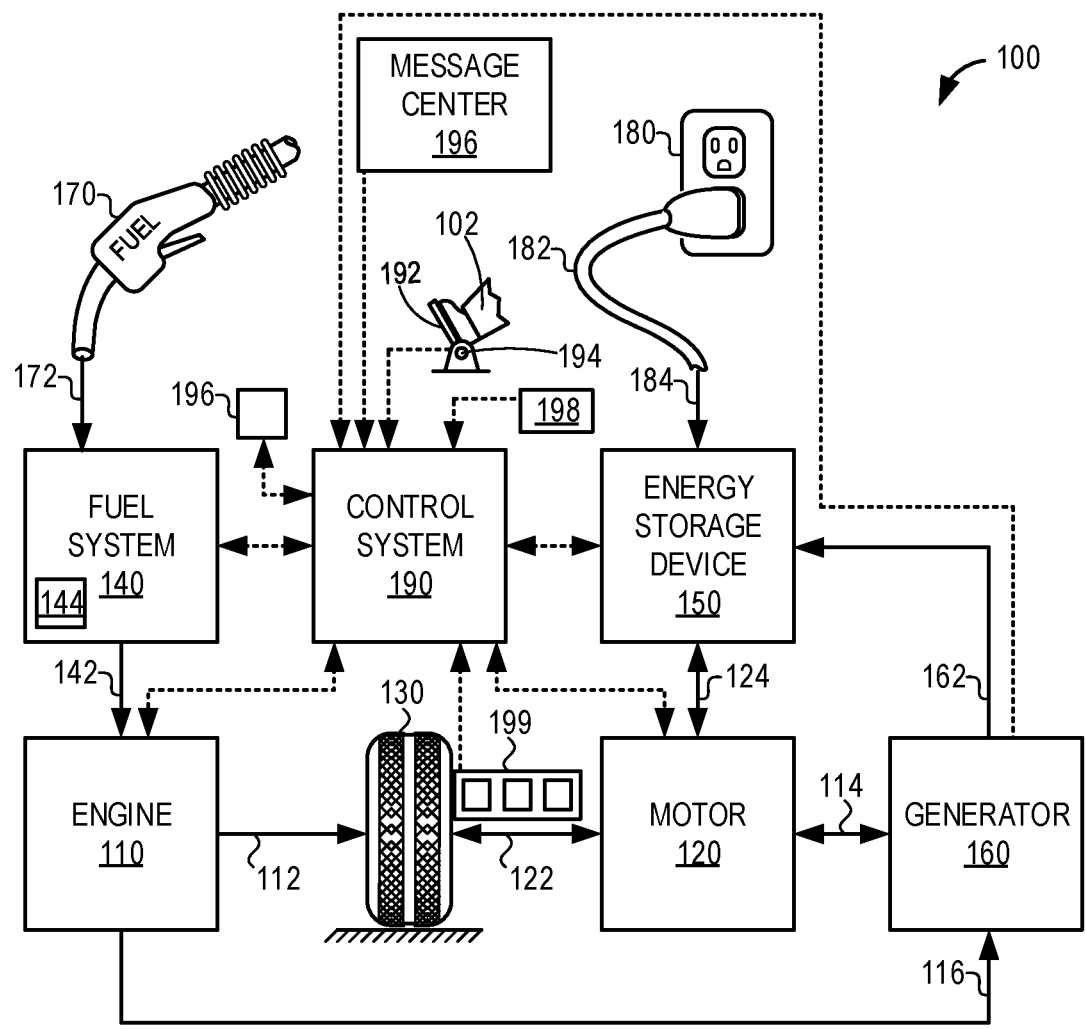
FIG. 1 shows an example hybrid vehicle propulsion system.
Figure 2:
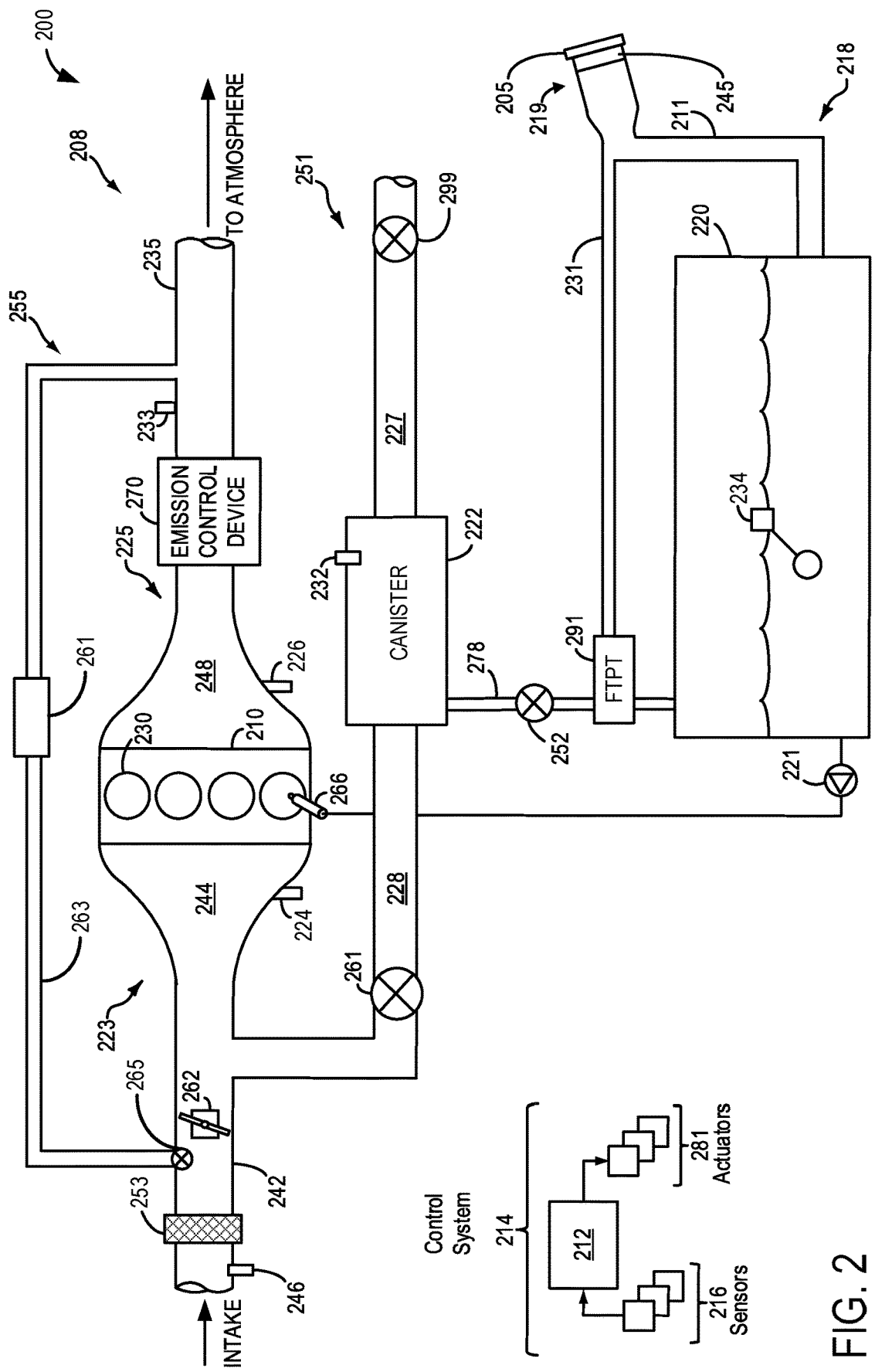
FIG. 2 shows an example vehicle engine system including a fuel system and an evaporative emissions system.

The following description relates to systems and methods for monitoring corking of a valve in a fuel vapor system during diagnostics of the fuel vapor system. A hybrid vehicle propulsion system configured to operate with one or both of motor torque from an electric motor and engine torque from an internal combustion engine is shown in FIG. 1. The engine system of the hybrid vehicle, as shown in FIG. 2, may include a fuel system and an evaporative emissions control (EVAP) system. The EVAP system may include a canister purge valve (CPV) in a purge line coupling the engine manifold to a canister storing fuel vapor and a canister vent solenoid (CVS) in a vent line coupling the canister to the atmosphere. A fuel system pressure sensor may be coupled to a fuel line to determine fuel tank pressure. An engine controller may be configured to perform control routines, such as the example routines of FIGS. 3 and 4, to determine a threshold fuel system pressure below which the CVS may be stuck closed and inhibit vacuum sealing of the CVS at the threshold pressure. A transfer function may be derived to estimate the threshold fuel system pressure, the transfer function graphically represented in FIG. 6. FIG. 5 shows an example monitoring of EVAP system valve positions and fuel system pressure during a diagnostic routine of the EVAP system.

Regarding terminology, as used herein, a vacuum may also be termed "negative pressure". Both vacuum and negative pressure refer to a pressure lower than atmospheric pressure. Further, an increase in vacuum may cause a higher level of vacuum as the vacuum approaches absolute zero pressure or perfect vacuum. When vacuum decreases, a level of vacuum reduces as the vacuum approaches atmospheric pressure level. In other words, a lower amount of vacuum indicates a shallow level of vacuum. Said another way, lower vacuum may be a negative pressure that is closer to atmospheric pressure than a higher (or deeper) level of vacuum. A pressure may be termed positive pressure when the pressure is higher than atmospheric (or barometric) pressure.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV) or simply a hybrid vehicle. Alternatively, the propulsion system 100 depicted herein may be termed a plug-in hybrid electric vehicle (PHEV).

Vehicle propulsion system 100 may be operated in a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric mode). Herein, the engine may be shut down to rest while the motor propels vehicle motion.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator operation in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated (herein also referred to as an engine mode). During other operating conditions, both engine 110 and motor 120 may each be operated to propel the vehicle via drive wheel 130 as indicated by arrows 112 and 122, respectively (herein also referred to as an assist mode). A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator operation to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Thus, liquid fuel may be supplied from fuel tank 144 to engine 110 of the motor vehicle shown in FIG. 1. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

The vehicle propulsion system 100 may also include an ambient temperature/humidity sensor 198 and a roll stability control sensor, such as a lateral and/or longitudinal and/or yaw rate sensor(s) 199. Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

FIG. 2 shows a schematic depiction of a vehicle system 200. The vehicle system 200 includes an engine system 208 coupled to a fuel system 218, an evaporative emissions control system 251 and an exhaust gas recirculation system 255. Evaporative emissions control system 251 (also termed, evaporative emissions system 251 and fuel vapor system 251) includes a fuel vapor container or fuel system canister 222 which may be used to capture and store fuel vapors.

In some examples, vehicle system 200 may be a hybrid electric vehicle system, such as the vehicle propulsion system 100 of FIG. 1. The engine system 208 may include an engine 210 having a plurality of cylinders 230. As such, engine 210 may be to the same as engine 110 of FIG. 1 while control system 214 of FIG. 2 may be the same as control system 190 of FIG. 1.

The engine 210 includes an engine intake 223 and an engine exhaust 225. The engine intake 223 includes a throttle 262 fluidly coupled to the intake manifold 244. Fresh intake air enters intake passage 242 and flows through air filter 253. Air filter 253 positioned in the intake passage 242 may clean intake air before the intake air is directed to the intake manifold 244. Cleaned intake air exiting the air filter 253 may stream past throttle 262 (also termed intake throttle 262) into intake manifold 244 via intake passage 242. As such, intake throttle 262, when fully opened, may enable a higher level of fluidic communication between intake manifold 244 and intake passage 242 downstream of air filter 253. An amount of intake air provided to the intake manifold 244 may be regulated via throttle 262 based on engine operating conditions. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

All or part of the treated exhaust from emission control 270 may be released into the atmosphere via exhaust conduit 235. Vehicle system 200 includes an exhaust gas recirculation (EGR) system 255 for routing a desired portion (depending on operating conditions) of exhaust gas from the exhaust passage 235 to the intake manifold 244 via an EGR passage 263. The amount of EGR provided may be varied by controller 212 by adjusting an EGR valve 265 in the EGR passage 263. By introducing exhaust gas to the engine 210, the amount of available oxygen for combustion is decreased, thereby reducing combustion flame temperatures and reducing the formation of NOR, for example.

Fuel system 218 may include a fuel tank 220 coupled to a fuel pump system 221. The fuel pump system 221 may include one or more pumps for pressurizing fuel delivered to the injectors of engine 210, such as the example injector 266. While only a single injector 266 is shown, additional injectors are provided for each cylinder. It will be appreciated that fuel system 218 may be a return-less fuel system, a return fuel system, or various other types of fuel system.

Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Evaporative emissions control (EVAP) system 251 may include one or more emissions control devices, such as one or more fuel vapor canisters 222 (also termed, canister 222) filled with an appropriate adsorbent. The canisters are configured to temporarily trap fuel vapors (including vaporized hydrocarbons) during fuel tank refilling operations and "running loss" (that is, fuel vaporized during vehicle operation). In one example, the adsorbent used is activated charcoal. Vapors generated in fuel system 218 may be routed to evaporative emissions control system 251, via vapor recovery line 231. Fuel vapors stored in fuel vapor canister 222 may be purged to the engine intake 223 at a later time. Vapor recovery line 231 may be coupled to fuel tank 220 via one or more conduits and may include one or more valves for isolating the fuel tank during certain conditions. Evaporative emissions system 251 may further include a canister ventilation path or vent line 227 which may route gases out of the canister 222 to the atmosphere. Vent line 227 may allow fresh air to be drawn into canister 222 when purging stored fuel vapors from canister 222 to engine intake 223 via purge line 228 and canister purge valve 261 (also termed, purge valve 261). For example, purge valve 261 may be normally closed but may be opened during certain conditions so that vacuum from engine intake manifold 244 is applied to the fuel vapor canister 222 for purging.

In some examples, the flow of air between canister 222 and the atmosphere may be regulated by a canister vent valve 299 (also referred herein as canister vent solenoid, CVS 299) coupled within vent line 227. A fuel tank isolation valve (FTIV) 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may be stored within canister 222 and air, stripped off fuel vapors, may then be vented to atmosphere via vent line 227. Fuel vapors stored in fuel vapor canister 222 may be purged along purge line 228 to engine intake 223 via canister purge valve 261 at a later time when purging conditions exist. As such, FTIV 252 when closed may isolate and seal the fuel tank 220 from the evaporative emissions system 251. It will be noted that certain vehicle systems may not include FTIV 252.

In some examples, recovery line 231 may be coupled to a fuel filler system 219 (or refueling system 219). In some examples, fuel filler system may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some embodiments, refueling lock 245 may be a fuel cap locking mechanism.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open FTIV 252 while closing canister purge valve (CPV) 261 to direct refueling vapors into canister 222 before venting the air to the atmosphere.

As another example, the fuel system may be operated in a refueling mode (e.g., when fuel tank refueling is requested by a vehicle operator), wherein the controller 212 may open FTIV 252, while maintaining canister purge valve 261 closed, to depressurize the fuel tank before allowing fuel to be added therein. As such, FTIV 252 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine running), wherein the controller 212 may open canister purge valve 261 while closing FTIV 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be performed opportunistically, such as when the hybrid vehicle is operated in an engine mode, and/or continued until the stored fuel vapor amount in the canister is below a threshold.

As a further example, a diagnostic routine of the EVAP system may be carried out upon entry conditions being met such as when the engine is idling. During a diagnostics routine, each of the CPV 261 and CVS 299 may be closed while the FTIV 252 may be opened. Since the fuel vapor system is sealed, in the absence of any degradation, the pressure in the fuel line, as estimated via the FTPT 291, may not change significantly. However, if there is an opening in the CPV 261 such as a leak, due to engine operation, vacuum from the engine intake manifold may be transferred to the fuel vapor system via the CPV 261. If the fuel system pressure reaches a vacuum (negative pressure) threshold, degradation of the CPV 261 may be indicated.

During the diagnostic routine for the EVAP system, if the CPV 261 is stuck in an open position, due to the vacuum build up in the EVAP system, the CVS 299 which has been closed for the diagnostic routine may be corked such as vacuum sealed. Vacuum sealing of the CVS 299 may cause CVS 299 to be stuck in a closed positon and CVS 299 may not be opened after completion of the diagnostic routine. Corking of the CVS 299 may cause hardware degradation such as damage to the fuel tank. Further, closing of the CVS 299 may hinder purging of the canister which may adversely affect emissions compliance.

While the diagnostic routine is being carried out, a threshold pressure of the fuel vapor system may be estimated and the CVS 299 may be opened responsive to a pressure of the fuel vapor system decreasing to the threshold pressure, regardless of a degree of completion of the diagnostic routine. By opening the CVS 299 in time, corking of the CVS 299 may be averted. Also, in response to the fuel system pressure decreasing to the threshold pressure, degradation of the fuel vapor system may be indicated (such as a leak in the CPV 261) and the diagnostic routine may be discontinued. The threshold pressure of the fuel vapor system may be estimated based on a transfer function with a fuel system vapor space as input and the threshold pressure as output. The fuel system vapor space may be estimated as a function of at least one of the fuel level in the fuel tank, a capacity of the fuel tank, and a volume of a fuel vapor canister. The transfer function may be calibrated during a calibration study based on a first pressure estimated via a dedicated, temporary, pressure sensor coupled to the vent line during the calibration study and a second pressure estimated via the fuel tank pressure sensor, the first pressure and the second pressure estimated concurrently.

Controller 212 may be included in control system 214. Control system 214 is shown receiving information from a plurality of sensors 216 (various examples of which are described herein) and sending control signals to a plurality of actuators 281 (various examples of which are described herein). As one example, sensors 216 may include manifold absolute pressure (MAP) sensor 224, barometric pressure (BP) sensor 246, exhaust gas sensor 226 located in exhaust manifold 248 upstream of the emission control device, temperature sensor 233, fuel tank pressure sensor 291 (also termed a fuel tank pressure transducer or FTPT), and canister temperature sensor 232.

Other sensors such as pressure, temperature, air/fuel ratio, and composition sensors may be coupled to various locations in the vehicle system 200. As another example, the actuators may include CPV 261, fuel injector 266, throttle 262, FTIV 252, fuel pump 221, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 3, 4 and 5.

The controller 212 receives signals from the various sensors of FIG. 2 and employs the various actuators of FIG. 2 to adjust engine operation based on the received signals and instructions stored on a memory of the controller. For example, adjusting the canister purge valve may include adjusting an actuator of the canister purge valve to adjust a flow rate of fuel vapors there-through. As such, controller 212 may communicate a signal to the actuator (e.g., canister purge valve solenoid) of the canister purge valve based on a desired purge flow rate. Accordingly, the canister purge valve solenoid may be opened (and pulsed) at a specific duty cycle to enable a flow of stored vapors from canister 222 to intake manifold 244 via purge line 228.

Leak detection routines may be intermittently performed by controller 212 on evaporative emissions system 251 and fuel system 218 to confirm that the fuel system is not degraded. In one example, leak detection routines may be performed while the engine is running by operating a vacuum pump and/or using engine intake manifold vacuum.

In this way, the system of FIGS. 1 and 2 provides for a vehicle system, comprising: a controller with computer readable instructions stored on non-transitory memory to: initiate a diagnostic routine for a fuel vapor system by closing each of a canister purge valve (CPV) coupling a canister to an engine intake manifold, a canister vent valve (CVS) coupling the canister to atmosphere, and opening an isolation valve coupling the canister to a fuel tank, monitor fuel system pressure via a fuel tank pressure sensor (FTPT) housed in a fuel line coupling the fuel tank to the canister, estimate a fuel system vapor space based on an estimated fuel level in the fuel tank, estimate a first threshold fuel system pressure based on the estimated fuel system vapor space, and in response to the fuel system pressure decreasing to the first threshold fuel system pressure, opening the CVS, and indicating degradation of the CPV.

Figure 3:
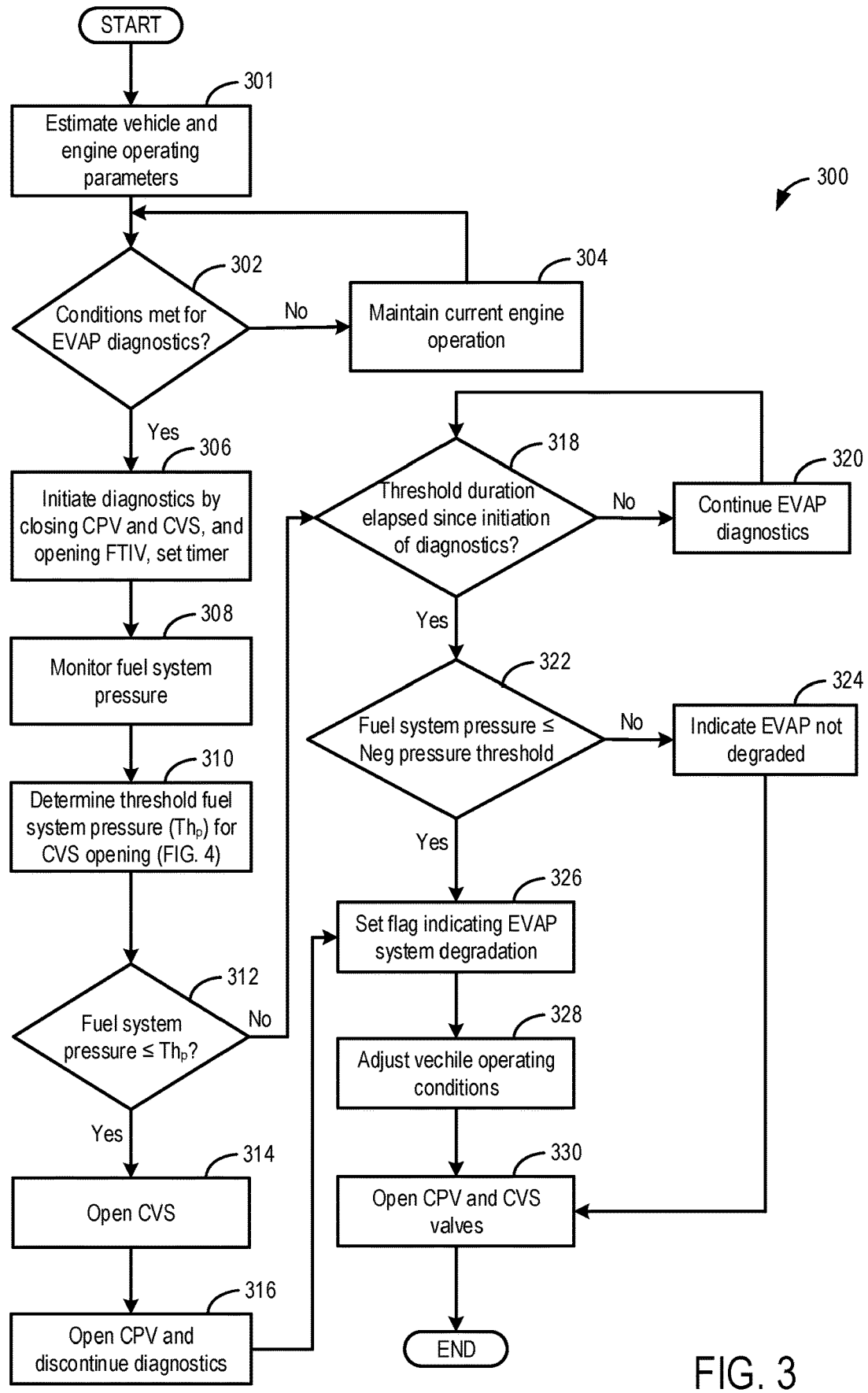
FIG. 3 shows a flow chart illustrating an example method that may be implemented for monitoring and inhibiting vacuum sealing of a canister vent solenoid (CVS) valve.

FIG. 3 shows an example method 300 for monitoring and inhibiting vacuum sealing of a canister vent solenoid (CVS) valve of an evaporative emission control (EVAP) system coupled to a hybrid vehicle. In one example, the EVAP system may be EVAP system 251 in FIG. 2. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

The method begins at 301 and includes estimating and/or measuring vehicle and engine operating conditions. The operating conditions may include vehicle speed, engine speed and/or load, engine temperature, exhaust temperature, gas pressures, mass air flow, etc. The vehicle location may be determined based on inputs from an onboard navigation system and/or from an external server. Further, ambient conditions such as ambient temperature, pressure, and humidity may be estimated.

At 302, the routine includes determining if conditions are met for carrying out diagnostics of the EVAP system. Diagnostics of the EVAP system may be carried out when a purge of the canister of the EVAP system is not being carried out.

As one example, conditions for carrying out diagnostics of the EVAP system may include engine operation at a threshold speed such as idling speed. During engine operation at the threshold speed, engine rotation causes a negative pressure in the engine intake manifold. As another example, entry conditions for EVAP system diagnostics may include a temperature of one or more fuel system components in a predetermined temperature range. For example, temperatures which are above a threshold may decrease accuracy of leakage detection. The entry conditions may be based on whether auxiliary components, for example, air conditioning, heat, or other processes, are using more than a threshold amount of stored energy.

As yet another example, conditions for carrying out diagnostics of the EVAP system may include an amount of time elapsed since a prior diagnostic routine. For example, diagnostics may be performed on a set schedule, for example, diagnostic routine may be performed after a vehicle has traveled a certain amount of miles since a previous diagnostics or after a certain duration has passed since a previous diagnostics.

If it is determined that the conditions for carrying out EVAP system diagnostics are not met, at 304, current engine operation may be continued without commencement of the EVAP system diagnostic routine.

If it is determined that the conditions are met for carrying out EVAP system diagnostics, at 306, EVAP system diagnostics may be initiated by closing a canister purge valve (such as CPV 261 in FIG. 2) housed in the purge line (such as purge line 228 in FIG. 2) coupling a fuel vapor canister (such as canister 222 in FIG. 2) of the EVAP system to the engine manifold and a canister vent solenoid (such as CVS 299 in FIG. 2) coupled to a vent line (such as vent line 227 in FIG. 2) of the EVAP system. The controller may send signals to the actuators of each of the CPV and the CVS to command the respective valves to their closed positions. A fuel tank isolation valve (such as FTIV 252) positioned between the fuel tank (such as fuel tank 220 in FIG. 2) and the fuel vapor canister may be opened. The controller may send a signal to the actuator of the FTIV to actuate the FTIV to an open position. The EVAP system diagnostic routine may be carried out for a pre-determined duration and a timer may be set to record the duration of the routine.

At 308, a fuel system pressure may be monitored via a fuel pressure sensor (such as FTPT 291 in FIG. 2) coupled to the fuel line over the pre-determined duration of the routine. Due to the closure of CPV and CVS and opening of the FTIV, the EVAP system and the fuel system (also referred as fuel vapor system) may be isolated from the engine and also the atmosphere. Due to isolation of the fuel vapor system, the pressure monitored by the FTPT may not change significantly, such as not change over 5% of its initial value (at the onset of the routine) over the period of the routine.

However, if the CPV is at least partially open (such as due to a leak), the EVAP system may be fluidically connected to the engine intake manifold while being isolated from the atmosphere (CVS closed). Engine operation may cause the EVAP system to be evacuated as the air from the EVAP system may be drawn to the engine intake manifold. The vacuum (negative pressure) from the engine intake manifold may be transferred to the EVAP system and the drop in pressure may be monitored via the FTPT.

A high level of vacuum generated at the EVAP system may cause the CVS to be corked (vacuum sealed). In order to inhibit vacuum sealing of the CVS, the CVS needs to be opened if the pressure at the CVS decreases to a threshold pressure. The fuel system pressure, as estimated via the FTIV, provides an estimation of pressure at the fuel tank. However, the fuel tank pressure may be different from the actual pressure at the CVS and it is not possible to equate fuel tank pressure to pressure at CVS. As an example, in presence of a CVS leak, the pressure at the CVS is lower than the fuel system pressure estimated by the FTPT. Therefore, in order to ensure timely opening of the CVS, scheduling of the CVS opening may not be carried out solely based on an estimated fuel system pressure. In the absence of a dedicated pressure sensor at the CVS, a pressure at the CVS corresponding to FTPT may be modeled.

At 310, a threshold fuel system pressure ($Th_p$) for opening the CVS during the diagnostic may be determined. $Th_p$ may correspond to a fuel system pressure below which the CVS may be corked and may not be actuated to an open position as desired. The magnitude of $Th_p$ may be lower than that of the actual pressure at the CVS. Therefore, by opening the CVS at $Th_p$, it may be ensured that the CVS is not corked shut. Determination of the threshold fuel system pressure ($Th_p$) is elaborated with reference to FIG. 4.

Figure 4:
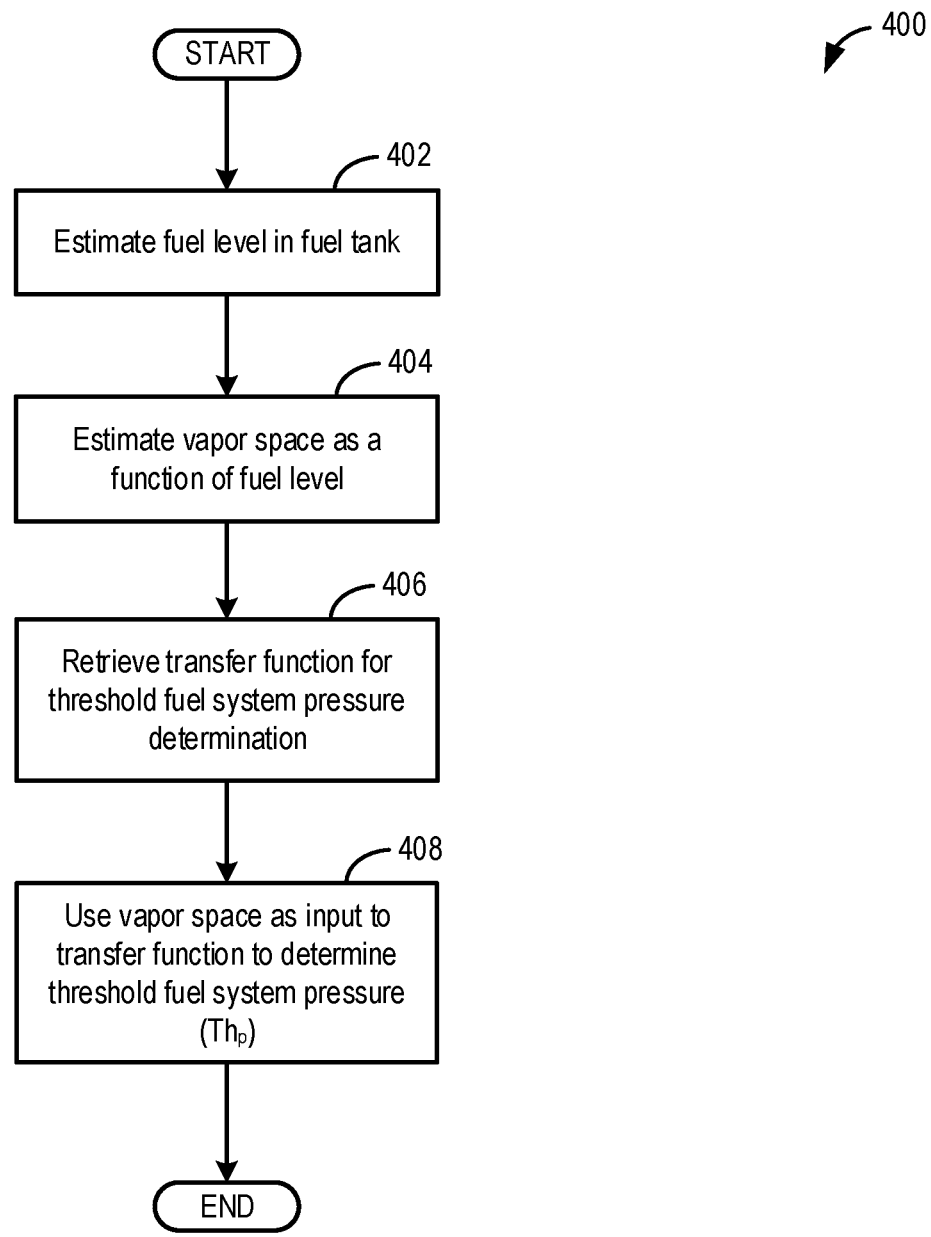
FIG. 4 shows a flow chart illustrating an example method that may be implemented for estimating a threshold fuel system pressure below which the CVS may be stuck closed.
Figure 5:
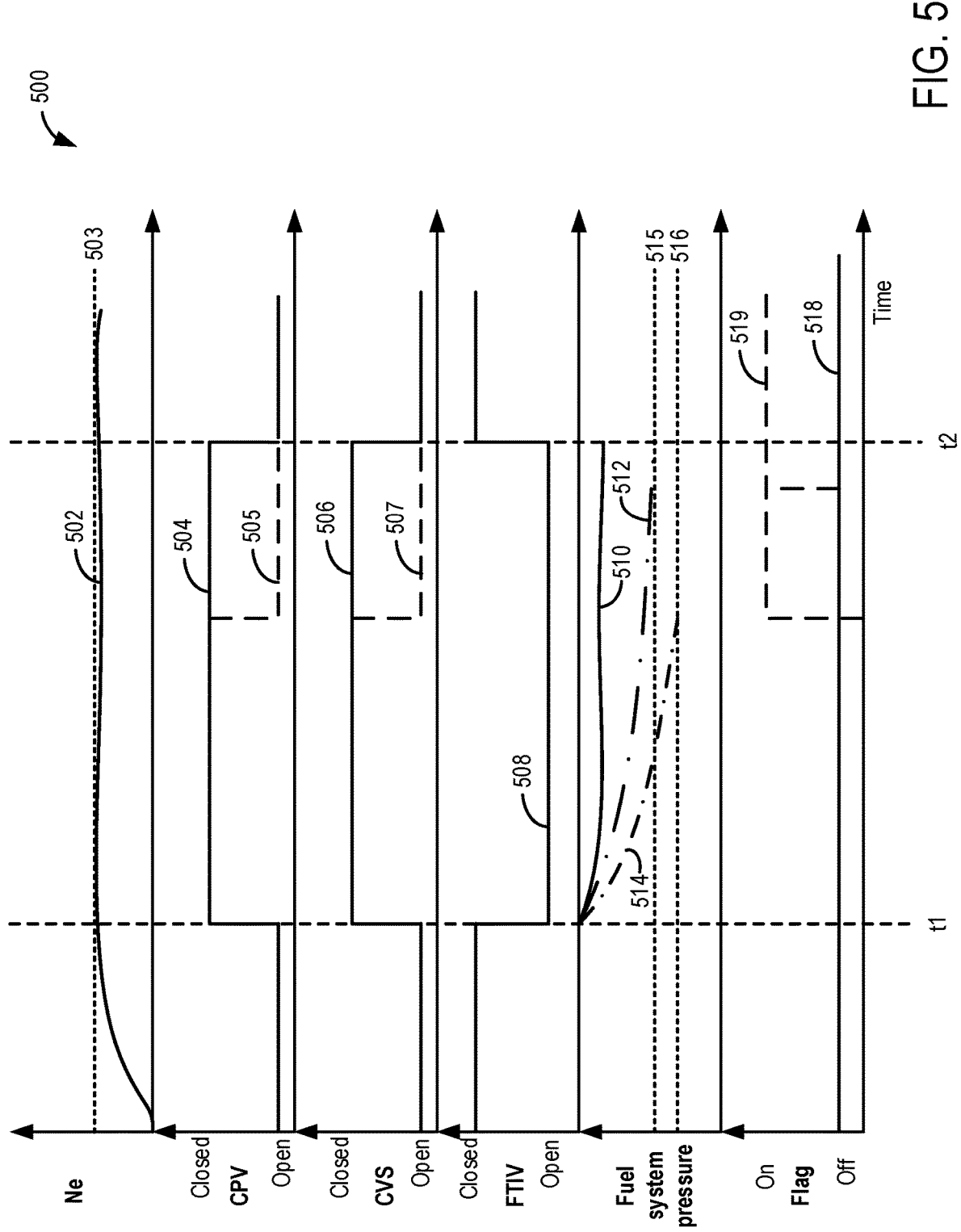
FIG. 5 shows an example monitoring of EVAP system valve positions during a diagnostic routine.

FIG. 4 shows an example method 400 for estimating a threshold fuel system pressure ($Th_p$) as estimated via a fuel system pressure sensor (such as FTPT 291 in FIG. 2) below which the CVS may be stuck closed. At 402, a fuel level in the fuel system fuel tank may be estimated via a fuel level sensor (such as sensor 234 in FIG. 2) located within the fuel tank.

At 404, a fuel system vapor space of the EVAP system may be estimated. The vapor space may be the volume of the EVAP system including the fuel tank filled with fuel vapor (such as above liquid fuel). The vapor space may be estimated as a function of the estimated fuel level in the fuel tank, total capacity of the fuel tank (in liters), capacity of the fuel tank that can be filed with fuel (fillable or advertised fuel tank capacity), and volume of the fuel vapor canister. The advertised fuel tank capacity may be lower than the total capacity of the fuel tank. As an example, the vapor space may be estimated based on equation 1.

$$VS = FV - (FLI \times FC) + CV \quad (1)$$

where VS is the vapor space, FV is the total capacity of the fuel tank, FLI is the fuel level in the fuel tank, FC is the advertised fuel tank capacity, and CV is the volume of the fuel vapor canister.

At 406, a transfer function may be retrieved from the controller memory for determination of a threshold fuel system pressure. As an example, a study of EVAP system pressure may be carried out at the manufacturing facility to calibrate the transfer function. In the study, an additional pressure sensor may be coupled to the vent line of the EVAP system proximal to the CVS. At a plurality of fuel levels in the fuel tank (each fuel level corresponding to a vapor space) and at another plurality of openings (simulating leak) in the CPV, fuel system pressure may be estimated via the FTPT and the corresponding vent line pressure may be estimated via the additional pressure sensor. The transfer function is populated based on the estimated vent line pressure corresponding to the measured fuel system pressure and the vapor space. Therefore, for a certain vapor space, a vent line pressure may be determined from a sensed fuel system pressure. In one example, the fuel system pressure, as estimated by the FTPT, may be buffered by fuel tank vapor space causing the level of vacuum at the position of the FTPT to be lower than the level of vacuum measured at the CPV as the same instant. Once calibrated, the transfer function in the form of a look-up table may be stored in the controller memory.

At 408, the fuel system vapor space may be used as input to the transfer function to determine threshold fuel system pressure ($Th_p$). As one example, the vapor space may be used as input to the transfer function and the $Th_p$ may be the output. $Th_p$ may be the fuel system pressure, as estimated via the FTPT, which corresponds to a vent line pressure at which the CVS may be corked closed.

In one example, at a 15% fuel level in the fuel tank and if the CPV is completely open, when the FTPT measures a pressure of −15.6 in $H_2O$, the pressure at the CVS (vent line) may be −19.3 in $H_2O$. If, for example, the pressure at which the CVS corks is −18 in $H_2O$, even if the FTPT measures a pressure higher than the −18 in $H_2O$, the actual pressure at the CVS would have been lower, causing the CVS to be vacuum sealed. The difference between the fuel system pressure (FTPT output) and the pressure at CVS (vent line pressure) may not be constant. Therefore, by taking into account the vapor space and using a pre-calibrated transfer function, the threshold fuel system pressure ($Th_p$) at which the CVS may opened to avert corking may be accurately estimated.

Figure 6:
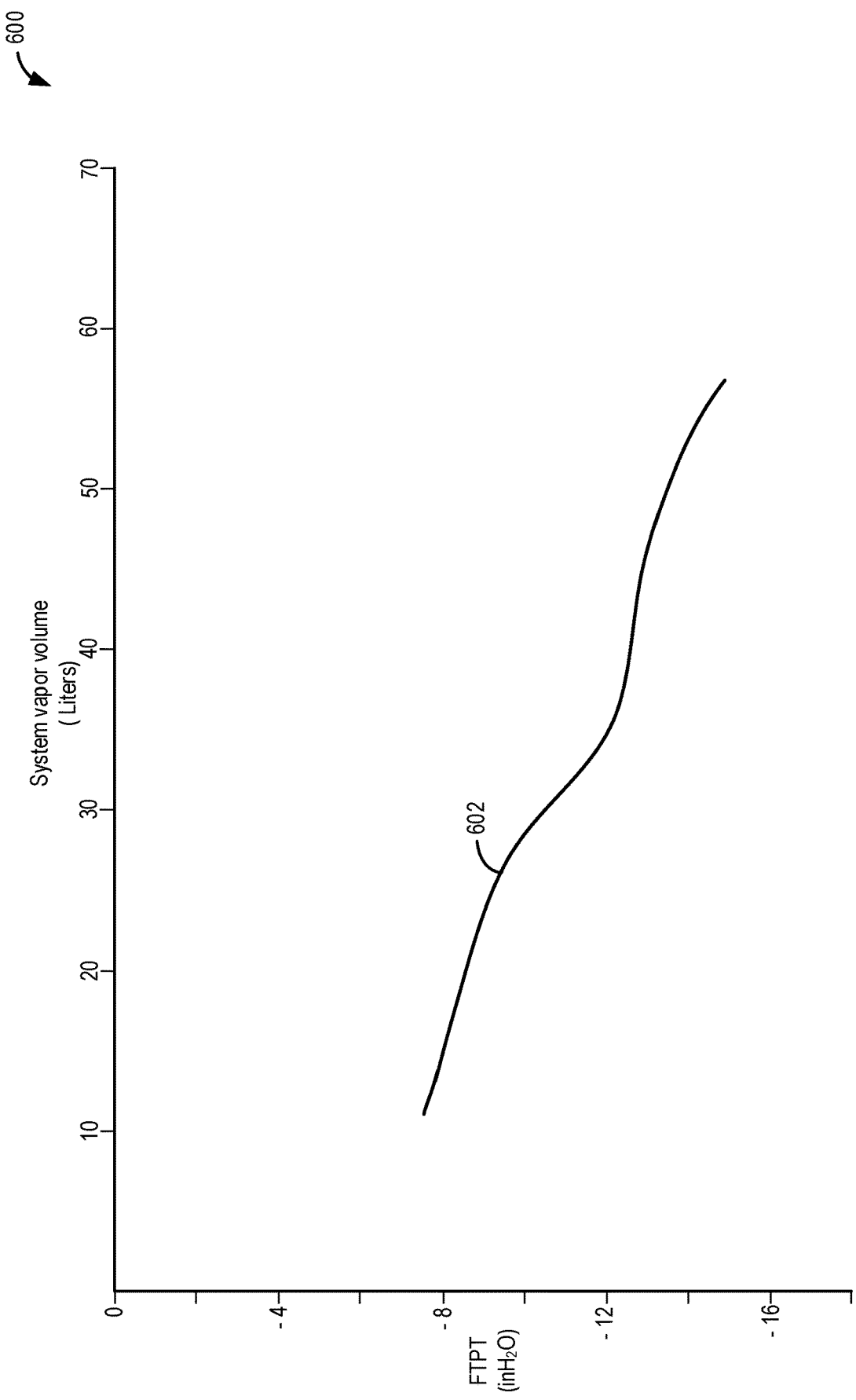
FIG. 6 shows a graphical representation of a transfer function used to estimate the threshold fuel system pressure.

FIG. 6 shows a graphical representation 600 of the transfer function used to estimate the threshold fuel system pressure ($Th_p$). The x-axis denotes system vapor volume (in liters) and the y-axis denotes the fuel system pressure, such as the output of the FTPT sensor, above which the CVS may be corked closed (the threshold fuel system pressure). The system vapor volume may be volume of the fuel vapor system that is occupied with fuel vapor and not liquid fuel. As seen from the plot 602, the threshold fuel system pressure ($Th_p$) decreases (increase in the level of vacuum) with an increase in system vapor volume.

Returning to FIG. 3, during the course of the EVAP system diagnostic routine, at 312, the routine includes determining if the fuel system pressure, as estimated by the FTPT, is lower than or equal to the determined threshold fuel system pressure ($Th_p$). If the fuel system pressure lowers to the $Th_p$, it may be inferred that the pressure at CVS has decreased further below $Th_p$. In one example, when the pressure at the fuel tank (estimated via FTPT) is −15.6 in H₂O, the pressure at the CVS may be −19.3 in H₂O. The pressure of −15.6 in H₂O may not have caused the CVS to cork, however due to the actual pressure being lower at the CVS (−19.3 in H₂O), the CVS may have been corked.

If it is determined that the fuel system pressure is lower than or equal to the determined threshold fuel system pressure ($Th_p$), at 314, the CVS may be opened regardless of the degree of completion of the EVAP system diagnostics. The controller may send a signal to the actuator of the CVS to actuate the CVS to an open position. In this way, by opening the CVS in a timely manner, vacuum sealing of the CVS may be averted and robustness of the EVAP system may be maintained.

Once the CVS is opened, at 316, the controller may send a signal to the actuator of the CPV to command the CPV to an open position and to command the FTIV to a closed position. Once the CPV and the CVS has been opened, the EVAP system diagnostics may be discontinued.

If it is determined that the fuel system pressure is higher than the determined threshold fuel system pressure ($Th_p$), it may be inferred that the pressure at the CVS is not low enough for the CVS to be corked and the EVAP system diagnostics may be continued as scheduled. At 318, the routine includes determining if a threshold duration has elapsed since initiation of the EVAP diagnostic routine. The threshold duration may correspond to the pre-determined duration of the routine which may be calibrated based on the time taken for air to be evacuated from the EVAP system in the presence of a degradation. If it is determined that the threshold duration has not elapsed since initiation of the EVAP diagnostic routine, at 320, the EVAP system diagnostics may be continued.

If it is determined that the threshold duration has elapsed since initiation of the EVAP diagnostic routine, it may be inferred that the diagnostics have been carried out for the pre-determined duration. At 322, the routine includes determining if the fuel system pressure, as estimated via the FTPT, is lower than a negative pressure threshold. The negative pressure threshold may be pre-calibrated based on a transfer of vacuum from the engine intake manifold to the EVAP system due to an opening of the CPV. In one example, the negative pressure threshold may be higher than the threshold fuel system pressure ($Th_p$). If due to an opening of the CPV, air from the EVAP system would be transferred to the engine intake manifold via the leaking CPV, the pressure in the EVAP system may drop to the negative pressure threshold.

If it is determined that the fuel system pressure is not lower than the negative pressure threshold, it may be inferred that the EVAP system is not degraded and the CPV does not have a leak. The EVAP system diagnostics may be concluded and the routine may proceed to step 330 wherein the CPV and he CVS may be commanded to their respective open positions and the FTIV may be commanded closed, thereby unsealing the EVAP system.

If it is determined that the fuel system pressure is lower than the negative pressure threshold, it may be inferred that the EVAP system is degraded such as the CPV may be leaking. At 326, a flag may be set indicating degradation of the EVAP system such as a leak in the CPV. The degree of degradation (size of leak) of the CPV may be estimated from the final fuel system pressure at the end of the diagnostic routine or the time to reach the negative pressure threshold from the initiation of the diagnostic routine. As an example, the size of the leak in the CPV may be higher if the pressure at the end of the diagnostic routine is lower or the time to reach the negative pressure threshold is lower.

If at 312, it is determined that the fuel system pressure is lower than or equal to the threshold fuel system pressure, it may also be inferred that the CPV is at least partially open causing vacuum to be generated at the EVAP system. Therefore, the routine may proceed from step 316 to step 326 to indicate degradation of the EVAP system even if the pre-determined duration of the diagnostic routine has not elapsed.

Upon indication of degradation of the EVAP system, at 328, vehicle operating conditions may be adjusted. In one example, a canister purge schedule may be updated based on the indication of undesired evaporative emissions. Further, an evaporative emissions test schedule may be updated, as a result of the indication of the CPV being degraded. For example, future evaporative emissions tests may be postponed until it is indicated that the CPV that is degraded has been evaluated. Further, canister purge operations may be scheduled to be conducted more frequently, such that vapors in the fuel system and/or evaporative emissions system may be purged to engine intake for combustion, rather than being released to atmosphere. In a still further example, due to the indication of the CPV being degraded, the vehicle may be scheduled to run in an electric mode whenever possible, to limit fuel tank vacuum which may develop during engine-on conditions as a result of the CPV that is degraded. At 330, the CVS and the CPV may be actuated to their respective open positions to unseal the fuel vapor system. The FTIV may be actuated to the default closed position.

In this way, upon conditions for conducting a diagnostic routine for a fuel vapor system being met, the fuel vapor system may be sealed by closing each of a canister vent solenoid (CVS) and a canister purge valve (CPV) to initiate a diagnostic routine for a threshold duration, a fuel system pressure may be monitored via a fuel tank pressure sensor, and in response to the fuel system pressure reaching a threshold fuel system pressure, the CVS may be opened regardless of a degree of completion of the threshold duration, the threshold fuel system pressure based on an estimated fuel level in a fuel tank.

FIG. 5 shows an example operating sequence 500 illustrating monitoring valve positions during a diagnostic routine of the EVAP system (such as EVAP system 251 in FIG. 2). The diagnostic routine includes sealing the EVAP system and monitoring a change in pressure in the fuel vapor system. The horizontal (x-axis) denotes time and the vertical markers t1-t2 identify significant times in the diagnostics of the EVAP system.

The first plot, line 502, shows a change in engine speed (Ne), as estimated via a crankshaft position sensor, over time. Dashed line 503 denotes engine idling speed. The second plot, line 504, shows a position of the canister purge valve (such as CPV 261 in FIG. 2) coupled to a purge line of the EVAP system. The third plot, line 506, shows a position of the canister vent solenoid (such as CVS 299 in FIG. 2) coupled to a vent line of the EVAP system. The fourth plot, line 508, shows a position of a fuel tank isolation valve (such as FTIV 252 in FIG. 2) coupled to a fuel vapor line of the EVAP system. The fifth plot, line 510, shows a change in fuel system pressure, as estimated via a fuel system pressure sensor (such as FTPT 291 in FIG. 2), during the course of the diagnostic routine. Dashed line 515 denotes a first threshold pressure below which it is determined that the EVAP system is degraded. The first threshold is pre-calibrated based on a transfer of vacuum from the engine intake manifold to the EVAP system due to an opening of the CPV.

Dashed line 516 denotes a second threshold pressure at which the CVS is to be actuated to an open position even if the diagnostic routine is not complete. The second threshold pressure is estimated based on a derived transfer function with system vapor space as input and the second threshold pressure as output. The sixth plot, line 518, denotes a flag (such as a diagnostic code) indicating a degradation of the EVAP system such as a leak in the CPV.

Prior to time t1, the engine is started from rest and the engine speed gradually increases to the idling speed 503. The CPV and the CVS may be in open positions while the FTIV may be in a closed position. The flag is maintained in the off state since any degradation of the EVAP system has not yet been identified.

At time t1, diagnostics of the EVAP system is initiated by sealing the fuel vapor system. The pre-determined duration of the diagnostic routine may be from time t1 to time t2 and in order to seal the fuel vapor system, each of the CPV and the CVS are commanded, by the controller, to their respective closed positions while the FTIV is commanded open. Due to sealing of the EVAP system, the pressure estimated at the fuel line stabilizes and remains significantly unchanged over the course of the diagnostic routine. The unchanged pressure signifies that there is no leak in the EVAP system lines or valves and air from the EVAP system is not removed to the engine manifold or the atmosphere.

At time t2, upon conclusion of the period for the diagnostics routine, based on the fuel system pressure being higher than each of the first threshold pressure 515 and the second threshold pressure 516, it is inferred that the EVAP system is not degraded and the flag is maintained in the off state. Also, at time t2, upon completion of the diagnostic routine, the CPV and the CVS are commanded open, the FTIV is commanded closed and engine operation is continued.

However, as an example, if during the course of the diagnostic routine, as shown by dashed line 512, if it is observed that the estimated fuel system pressure reduces to the first threshold pressure, it is inferred that there is a degradation of the EVAP system. Due to the degradation (such as a leak), air from the EVAP system is drawn by the rotating engine, thereby causing the pressure in the EVAP system to reduce to the first threshold level. Accordingly, the flag is turned on (as shown by dashed line 519) and a diagnostic code is set indicating the degradation.

As another example, if during the course of the diagnostic routine, as shown by dashed line 514, if it is observed that the estimated fuel system pressure reduces to the second threshold pressure, the CVS is commanded to an open position immediately (prior to completion of the routine at time t2). By timely opening the CVS, vacuum sealing of the CVS is averted. Further, reduction of the fuel system pressure to the second threshold pressure which is lower than the first threshold pressure signifies that there is a degradation in the EVAP system. In response, the flag is turned on (as shown by dashed line 519) and a diagnostic code would have been set indicating the degradation.

In this way, even in absence of a dedicated pressure sensor at the vent line of an EVAP system, a transfer function may be derived and used to determine a threshold fuel system pressure at which the CVS may be opportunistically opened to avert corking of the CVS at increased level of vacuum.

In one example, a method for an engine, comprises: during closure of a canister vent solenoid (CVS) coupled to a vent line of a fuel vapor system, estimating a threshold pressure of the fuel vapor system based on a fuel level in a fuel tank; and opening the CVS responsive to a pressure of the fuel vapor system decreasing to the threshold pressure. In the preceding example, additionally or optionally, the CVS is closed during a diagnostic routine of the fuel vapor system. In any or all of the preceding examples, additionally or optionally, during operation of the engine at an idling speed, monitoring the pressure of the fuel vapor system via a fuel tank pressure sensor over a pre-determined duration. In any or all of the preceding examples, the method further comprising, additionally or optionally, upon completion of the pre-determined duration, in response to the fuel system decreasing to another threshold pressure, indicating degradation of the fuel vapor system. In any or all of the preceding examples, the method further comprising, additionally or optionally, in response to indication of degradation the fuel vapor system, updating a purge schedule of the fuel vapor canister to increase a frequency of purge of fuel vapors to an engine intake manifold. In any or all of the preceding examples, the method further comprising, additionally or optionally, during the diagnostic routine, closing a canister purge valve (CPV) coupled to a purge line of the fuel vapor system and opening a fuel tank isolation valve (FTIV) coupled to a fuel line of the fuel vapor system. Any or all of the preceding examples, further comprising, additionally or optionally, in response to the fuel system pressure decreasing to the threshold pressure, indicating degradation of the fuel vapor system and discontinuing the diagnostic routine, the threshold pressure lower than the another threshold pressure. In any or all of the preceding examples, additionally or optionally, the threshold pressure of the fuel vapor system is estimated based on a transfer function with a fuel system vapor space as input and the threshold pressure as output. In any or all of the preceding examples, additionally or optionally, the fuel system vapor space is estimated as a function of at least one of the fuel level in the fuel tank, a capacity of the fuel tank, and a volume of a fuel vapor canister. In any or all of the preceding examples, additionally or optionally, the transfer function is calibrated during a calibration study based on a first pressure estimated via a dedicated, temporary, pressure sensor coupled to the vent line during the calibration study and a second pressure estimated via the fuel tank pressure sensor, the first pressure and the second pressure estimated concurrently.

Another example method for a fuel vapor system comprises: upon conditions for conducting a diagnostic routine for a fuel vapor system being met, sealing the fuel vapor system by closing each of a canister vent solenoid (CVS) and a canister purge valve (CPV) to initiate a diagnostic routine for a threshold duration, monitoring a fuel system pressure via a fuel tank pressure sensor, and in response to the fuel system pressure reaching a threshold fuel system pressure, opening the CVS regardless of a degree of completion of the threshold duration, the threshold fuel system pressure based on an estimated fuel level in a fuel tank. In any or all of the preceding examples, additionally or optionally, the conditions for conducting the fuel system diagnostic include engine rotation at an idling speed. In any or all of the preceding examples, additionally or optionally, the threshold fuel system pressure is estimated via a transfer function with a vapor space of the fuel vapor system as input and the threshold fuel system pressure as an output. In any or all of the preceding examples, additionally or optionally, the vapor space of the fuel vapor system is estimated as a function of one or more of the estimated fuel level in the fuel tank, a total capacity of the fuel tank, a fillable capacity of the fuel tank, and a volume of a fuel vapor canister. In any or all of the preceding examples, additionally or optionally, the transfer function is pre-calibrated based on a first pressure estimated at the fuel tank and a second pressure concurrently estimated at a vent line of the fuel vapor system housing the CVS, the transfer function being saved in a controller memory. In any or all of the preceding examples, the method further comprising, additionally or optionally, upon the fuel system pressure reaching a threshold fuel system pressure, indicating degradation of the CPV.

In yet another example, a vehicle system, comprises: a controller with computer readable instructions stored on non-transitory memory to: initiate a diagnostic routine for a fuel vapor system by closing each of a canister purge valve (CPV) coupling a canister to an engine intake manifold, a canister vent valve (CVS) coupling the canister to atmosphere, and opening an isolation valve coupling the canister to a fuel tank, monitor fuel system pressure via a fuel tank pressure sensor (FTPT) housed in a fuel line coupling the fuel tank to the canister, estimate a fuel system vapor space based on an estimated fuel level in the fuel tank, estimate a first threshold fuel system pressure based on the estimated fuel system vapor space, and in response to the fuel system pressure decreasing to the first threshold fuel system pressure, open the CVS, and indicate degradation of the CPV. In the preceding example system, additionally or optionally, the fuel system vapor space is further based on a capacity of the fuel tank and a volume of the canister. In any or all of the preceding examples, additionally or optionally, the first threshold fuel system pressure is estimated via a pre-calibrated transfer function with the fuel vapor space as input and the first threshold fuel system pressure as output. In any or all of the preceding examples, additionally or optionally, the controller includes further instructions to: in response to the fuel system pressure being above the first fuel system pressure threshold and below a second fuel system pressure threshold at an end of the diagnostic routine, indicating degradation of the CPV, the second fuel system pressure threshold higher than the first fuel system pressure threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
    a controller with computer readable instructions stored on non-transitory memory to:
    initiate a diagnostic routine for a fuel vapor system by closing each of a canister purge valve (CPV) coupling a canister to an engine intake manifold, a canister vent valve (CVS) coupling the canister to atmosphere, and open an isolation valve coupling the canister to a fuel tank;
    monitor fuel system pressure via a fuel tank pressure sensor (FTPT) housed in a fuel line coupling the fuel tank to the canister;
    estimate a fuel system vapor space based on an estimated fuel level in the fuel tank;
    estimate a first threshold fuel system pressure based on the estimated fuel system vapor space; and
    in response to the fuel system pressure decreasing to the first threshold fuel system pressure, open the CVS, and indicate degradation of the CPV.

2. The system of claim 1, wherein the fuel system vapor space is further based on a capacity of the fuel tank and a volume of the canister.

3. The system of claim 1, wherein the first threshold fuel system pressure is estimated via a pre-calibrated transfer function with the fuel vapor space as input and the first threshold fuel system pressure as output.

4. The system of claim 1, wherein the controller includes further instructions to: in response to the fuel system pressure being above the first fuel system pressure threshold and below a second fuel system pressure threshold at an end of the diagnostic routine, indicate degradation of the CPV, the second fuel system pressure threshold higher than the first fuel system pressure threshold.

5. A method for an engine, comprising:
    during closure of a canister vent solenoid (CVS) coupled to a vent line of a fuel vapor system,
    estimating a threshold pressure of the fuel vapor system based on a fuel level in a fuel tank; and opening the CVS responsive to a pressure of the fuel vapor system decreasing to the threshold pressure.

6. The method of claim 5, wherein the CVS is closed during a diagnostic routine of the fuel vapor system.

7. The method of claim 6, wherein the diagnostic routine includes, during operation of the engine at an idling speed, monitoring the pressure of the fuel vapor system via a fuel tank pressure sensor over a pre-determined duration.

8. The method of claim 6, further comprising, upon completion of the pre-determined duration, in response to the fuel system decreasing to another threshold pressure, indicating degradation of the fuel vapor system.

9. The method of claim 8, further comprising, in response to indication of degradation the fuel vapor system, updating a purge schedule of the fuel vapor canister to increase a frequency of purge of fuel vapors to an engine intake manifold.

10. The method of claim 8, further comprising, during the diagnostic routine, closing a canister purge valve (CPV) coupled to a purge line of the fuel vapor system and opening a fuel tank isolation valve (FTIV) coupled to a fuel line of the fuel vapor system.

11. The method of claim 10, further comprising, in response to the fuel system pressure decreasing to the threshold pressure, indicating degradation of the fuel vapor system and discontinuing the diagnostic routine, the threshold pressure lower than the another threshold pressure.

12. The method of claim 11, wherein the fuel system vapor space is estimated as a function of at least one of the fuel level in the fuel tank, a capacity of the fuel tank, and a volume of a fuel vapor canister.

13. The method of claim 11, wherein the transfer function is calibrated during a calibration study based on a first pressure estimated via a dedicated, temporary, pressure sensor coupled to the vent line during the calibration study and a second pressure estimated via the fuel tank pressure sensor, the first pressure and the second pressure estimated concurrently.

14. The method of claim 5, wherein the threshold pressure of the fuel vapor system is estimated based on a transfer function with a fuel system vapor space as input and the threshold pressure as output.

15. A method for a fuel vapor system, comprising:
upon conditions for conducting a diagnostic routine for a fuel vapor system being met,
sealing the fuel vapor system by closing each of a canister vent solenoid (CVS) and a canister purge valve (CPV) to initiate a diagnostic routine for a threshold duration;
monitoring a fuel system pressure via a fuel tank pressure sensor; and
in response to the fuel system pressure reaching a threshold fuel system pressure, opening the CVS regardless of a degree of completion of the threshold duration, the threshold fuel system pressure based on an estimated fuel level in a fuel tank.

16. The method of claim 15, wherein the conditions for conducting the fuel system diagnostic include engine rotation at an idling speed.

17. The method of claim 15, wherein the threshold fuel system pressure is estimated via a transfer function with a vapor space of the fuel vapor system as input and the threshold fuel system pressure as an output.

18. The method of claim 17, wherein the vapor space of the fuel vapor system is estimated as a function of one or more of the estimated fuel level in the fuel tank, a total capacity of the fuel tank, a Tillable capacity of the fuel tank, and a volume of a fuel vapor canister.

19. The method of claim 17, wherein the transfer function is pre-calibrated based on a first pressure estimated at the fuel tank and a second pressure concurrently estimated at a vent line of the fuel vapor system housing the CVS, the transfer function being saved in a controller memory.

20. The method of claim 15, further comprising, upon the fuel system pressure reaching a threshold fuel system pressure, indicating degradation of the CPV.

\* \* \* \* \*